US006224489B1

United States Patent
Gille et al.

(10) Patent No.: US 6,224,489 B1
(45) Date of Patent: May 1, 2001

(54) CROSS MEMBER FOR A UNIVERSAL JOINT FOR HIGH TORQUE LOADS

(75) Inventors: Wilfried Gille, Dorsten; Walter Bischoff, Münster, both of (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 09/340,586

(22) Filed: Jun. 28, 1999

(30) Foreign Application Priority Data

Jul. 11, 1998 (DE) .............................................. 198 31 143

(51) Int. Cl.$^7$ ...................................................... F16D 3/16
(52) U.S. Cl. .................................................................. 464/136
(58) Field of Search ............................... 464/14, 112, 133, 464/136, 11, 12, 13; 192/DIG. 2

(56) References Cited

U.S. PATENT DOCUMENTS

| 1,093,822 | * | 4/1914 | Blum | 464/136 X |
| 4,371,358 | * | 2/1983 | Laue | 464/136 |
| 4,634,401 | * | 1/1987 | Mueller et al. | 464/136 |
| 4,758,203 | * | 7/1988 | Breazeale et al. | 464/136 |
| 4,925,430 | * | 5/1990 | Heier | 464/136 X |

FOREIGN PATENT DOCUMENTS

| 299721 | 6/1972 | (AT) . |
| 1 955 010 | 12/1970 | (DE) . |
| 26 36 752 A1 | 4/1977 | (DE) . |
| 27 21 706 A1 | 11/1977 | (DE) . |
| 35 09 469 A1 | 10/1985 | (DE) . |
| 31 11 145 C2 | 12/1986 | (DE) . |
| 38 18 330 A1 | 12/1989 | (DE) . |
| 972516 | * | 10/1964 | (GB) | 464/14 |
| 61-270524 | 11/1986 | (JP) . |
| 64-39321 | 2/1989 | (JP) . |
| 889936 | * | 10/1964 | (SU) | 464/136 |

OTHER PUBLICATIONS

Machinery's Handbook, 25th ed. New York, International Press, pp 506 & 507.TJ151.M3 1996.*
Mancuso , J., Couplings and Joints, N.Y., Marcel Dekker, pp 392–399. TJ183.M36 1999.*

* cited by examiner

Primary Examiner—Lynne H. Browne
Assistant Examiner—Greg Binda
(74) Attorney, Agent, or Firm—Harness, Dickey & Pierce, P.L.C.

(57) ABSTRACT

A cross member for a universal joint has a base member (1) and four arms (2). The arms (2) extend away from a base member (1). To increase the torque bearing capacity of the cross member, the outer face of the arm (2) (if viewed in a longitudinal section) extends curve-like in a transition region (18) to the base member with a continually increasing diameter and with a decreasing radius of curvature (R). If viewed in a sectional plane extending through the axes (4, 5), a distance (X) exists between a first tangent (14), on the outer face of the transition region, and a second tangent parallel to the first tangent (14). The first tangent (14) extends at an angle of 45 degrees relative to the axis (4). The second tangent (15), if viewed from the center (6), is positioned behind the first tangent (14). The second tangent (15) contacts the outer face of the base member (1) at a point (16) which is located on a line of symmetry (17) of the cross member. The line of symmetry (17) extends at an angle of 45 degrees relative to the axis (4). The distance (X) corresponds to $\frac{1}{10}$ of the smallest radius (B) of the respective arm (2). The arms (2) are induction-hardened. The hardness run-out occurs in a region of the base member (1) which is subjected to low stresses only under operational conditions.

4 Claims, 2 Drawing Sheets

CROSS MEMBER FOR A UNIVERSAL JOINT FOR HIGH TORQUE LOADS

CROSS-REFERENCE TO RELATED APPLICATIONS

This application claims priority upon German application 198 31 143.5 filed Jul. 11, 1998, which is incorporated herein by reference.

BACKGROUND OF THE INVENTION

The invention relates to a cross member for a universal joint. The cross member includes a base member arranged at the center of the cross member. Four arms project from the base member and extend away from the center. Opposing arm pairs define a common axis. The axes intersecting one another in the center of the universal joint at a right angle. Each arm includes a cylindrical running face to receive rolling contact members of a rolling contact bearing. Each running face is arranged concentrically around its respective axis. The base member, in the region of transition to an arm, includes an annular and radially extending shoulder. The shoulder is arranged co-axially around the respective axis.

DE-OS 27 21 706 describes a cross member for a universal joint. Here, the arms each change step-like into the annular shoulder of the base member. Universal joints of this type are primarily used in driveshafts. Two universal joints are connected in a rotationally fast way by telescopically connected shaft portions. At its input end and at its output end, the universal joint includes a joint yoke. The joint yokes are connected to one another in a rotationally fast way by the cross member. The arms of the cross member are supported in rolling contact bearing bushes which are accommodated in bores in the joint yokes. The torque transmitting ability of a universal joint is largely determined by the design of the joint yokes, the cross member and the bearings. In particular, the torque transmitting ability is limited by the strength of the highly loaded transition regions between the arm running faces and the base member. This may result in disadvantages and problems, especially in heavy-duty joints used in rolling mill drives.

SUMMARY OF THE INVENTION

It is an object of the present invention to provide a cross member of the initially mentioned type which, while retaining its external dimensions, can be subjected to higher torque loads when used in universal joints.

In accordance with the invention, each arm includes a transition region between the running face and the base member. The transition region outer face extends curve-like with a continuously increasing diameter and with a decreasing radius of curvature relative to the respective shoulder of the base member. Viewing a sectional plane extending between the axes of the arms, a distance exists between a first tangent on the outer face arm transition region and a second tangent which extends parallel to the first tangent. The first tangent extends at a 45° angle relative to the axis of the respective arm. The second tangent, viewed from the center, is positioned behind the first tangent and is positioned on the outer face of the base member at a point located on a line of symmetry of the cross member. The line of symmetry extends at an angle of 45° relative to the axis of the respective arm. The distance corresponds to $\frac{1}{10}$ of the smallest radius of the respective arm. The arms are induction-hardened. The hardness run-out occurs in the region of the shoulder of the base member. This region is subjected to low stresses when the cross member is in operation. Thus, it is possible to provide a low notch curve in the transition region between the bearing face and the base member. This achieves a high torque transmitting capacity of the cross member. In addition, the arms of the cross member are induction-hardened beyond the curve of the transition region. Accordingly, it is possible to avoid metallurgical notches inside the transition region which is subjected to high loads during operation. The hardness run-out occurs in a low-stress region of the shoulder. Further, required strength values can also be achieved in great depths below the surface of the workpiece by induction-hardening.

To achieve an adequate seat face length for a sealing ring in the transition region, arm transition regions can end in the respective shoulder of the base member, each forming an annular indentation.

A reduction in diameter in the region adjoining the running face of an arm between the running face and the transition region provides a grinding run-out. The grinding run-out facilitates the production of the cross member.

The torque bearing capacity of the cross member is increased even further by producing the cross member from a quenched and tempered chromium nickel steel.

From the following detailed description, taken in conjunction with the accompanying drawings and subjoined claims, other objects and advantages of the present invention will become apparent to those skilled in the art.

BRIEF DESCRIPTION OF THE DRAWINGS

Preferred embodiments will be explained in greater detail with reference to the drawing wherein.

DETAILED DESCRIPTION OF THE PREFERRED EMBODIMENT

Figure 1:
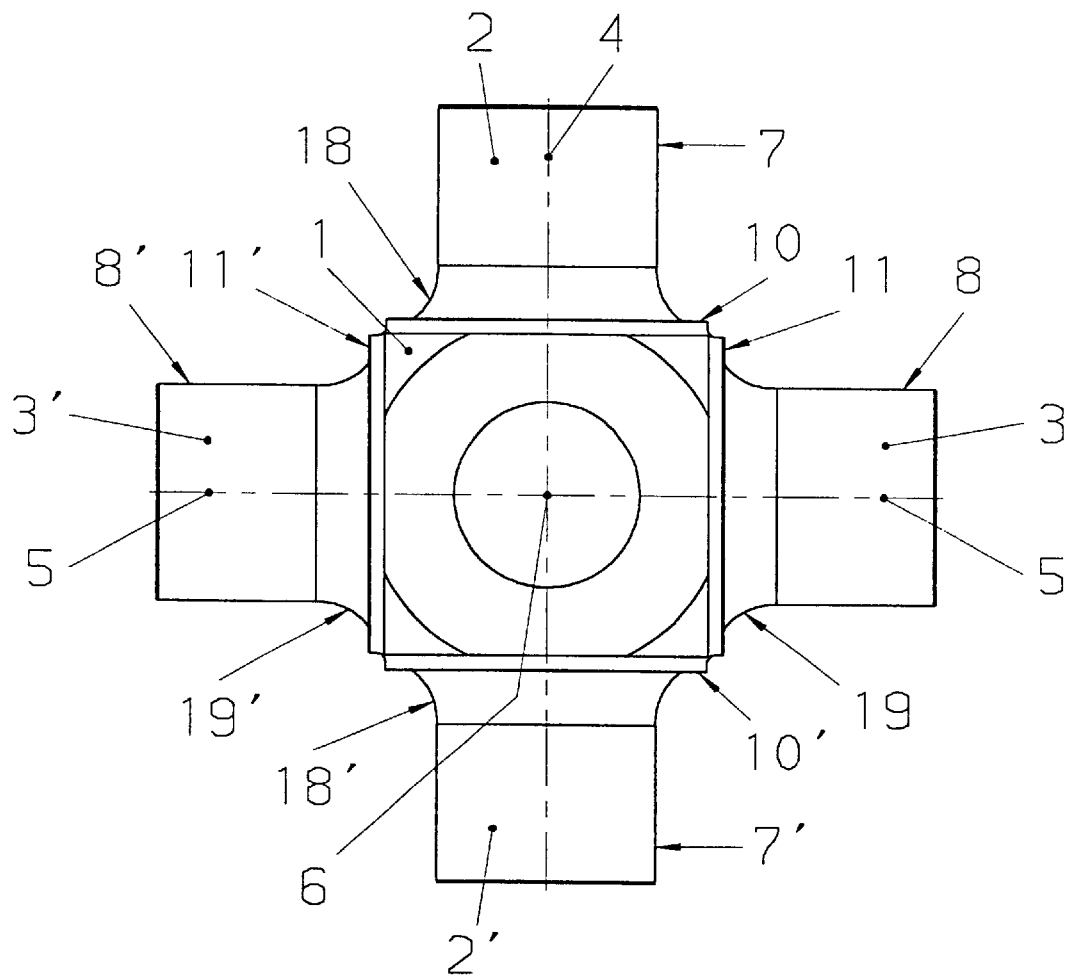
FIG. 1 is a plan view of a cross member in accordance with the invention.
Figure 2:
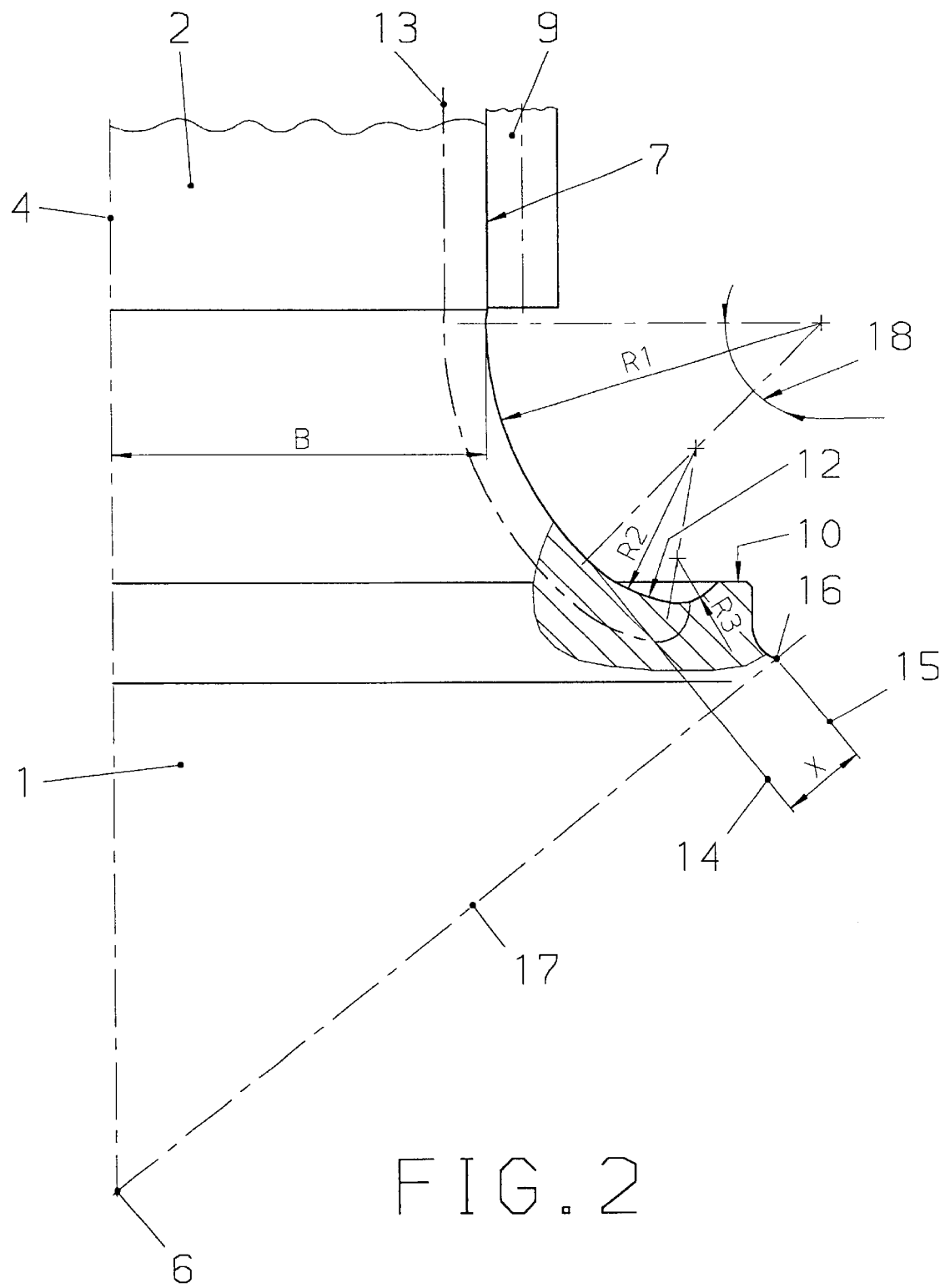
FIG. 2 is an enlarged plan view partially in cross section of a cross member according to FIG. 1 of a transition region between an arm and the base member.

FIGS. 1 and 2 will be described jointly below. Identical parts have been given the same reference numbers. The cross member includes a base member 1 with four projecting arms 2, 2', 3, 3'. The arms 2, 2', 3, 3' extend away from a center 6 of the cross member. The arms 2, 2' define a common axis 4 and the arms 3, 3' define a second common axis 5. The axes 4, 5 intersect one another in the center 6 of the cross member. Each arm includes a cylindrical running face 7, 7', 8, 8' for rolling contact members 9. The running faces are arranged concentrically around the respective axis 4, 5.

The rolling contact members 9 are received in bearing bushes (not illustrated). The bearing bushes are accommodated in bores of joint yokes of a universal joint. The bearing bushes of the arms 2, 2' are received in one joint yoke. The bearing bushes of the arms 3, 3' are received in the other joint yoke. The joint yokes are thus connected to one another in a rotationally fast way and are articulatable relative to one another.

An annular and radially extending shoulder 10, 10', 11, 11' is positioned between the arms and the base 1. The arms 2, 2', 3, 3' each include a transition region 18, 18', 19, 19' arranged between the running faces 7, 7', 8, 8' and the base member 1.

FIG. 2 shows an enlarged illustration of the transition region 18. The radius of the arm 2 is initially reduced to the value B between the running face 7, 7', 8, 8' and the transition region 18, 18', 19, 19'. The radius is smaller than the radius of the arm 2 in the region of the running face 7. In the transition region 18, 18', 19, 19', the radius is increased. The curve of the outer face transition region 18, 18', 19, 19' initially has a radius of curvature R1 and thereafter a radius of curvature R2. The radius of curvature R2 is reduced relative to the radius of curvature R1. Finally, a radius of curvature R3 is reduced relative to the radius of curvature R2. As a result of the shape of the outer face of the transition region 18 to the base member 1, an annular indentation 12 is formed in the shoulder 10 of the base member 1.

The outer face of the transition region 18 serves as a seat for a sealing ring for sealing a bearing bush (not illustrated) which is slipped over the arm 2. FIG. 2 also shows a hardness line 13 which represents the line of uniform hardness if viewed in a longitudinal section. The hardness line 13 extends at a constant distance from the outer face of the arm 2 into the base member 1. The line 13 ends at the indentation 12 of the shoulder 10. The hardness run-out thus occurs in a cross member region which is subjected to low stresses only under load.

A distance X occurs in a sectional plane extending between the axes 4, 5. The distance X is between a first tangent 14 on the outer face of the arm 2 in the transition region 18 and a second tangent 15 which extends parallel to the first tangent 14. The tangent 14 extends at a 45 degree angle relative to the axis 4 of the arm 2. The second tangent 15, if viewed from the center, is positioned behind the first tangent 14. The second tangent 15 contacts the outer face of the base member at a point 16 which is located on a line of symmetry 17 of the cross member. The line of symmetry 17 extends at a 45 degree angle relative to the axis 4 of the arm 2. The distance X corresponds to $\frac{1}{10}$ of the smallest radius B of the arm 2.

Corresponding conditions exist in the remaining arms 2, 2', 3, 3'. If the conditions are met, there is no need for any special strength increasing measures, such as strain hardening by solid-rolling the base member 1 in an annular region around the respective axis 4, 5 of the arms 2, 2', 3, 3', which annular region extends through the point 16. The basic strength of the material is sufficient for this region.

While the above detailed description describes the preferred embodiment of the present invention, the invention is susceptible to modification, variation and alteration without deviating from the scope and fair meaning of the subjoined claims.

What is claimed is:

1. A cross member for a universal joint, comprising:

a base member defining a center of the cross member;

four arms projecting from said base member and extending away from the center;

opposing pairs of arms define a common axis, said axes intersecting one another in the center while defining a right angle, each arm including a cylindrical running face for rolling contact members of a rolling contact bearing, said running face is arranged concentrically around the respective axis;

an annular and radially extending shoulder is arranged co-axially around the respective axis in a region joining the base member and each arm, each arm includes a transition region between the running face and the base member, the transition region outer face extends curve-like with a continuously increasing diameter and with a decreasing radius of curvature to the respective shoulder of the base member, and when viewed in a sectional plane extending between the axes of the arms, a distance (X) is formed between a first tangent on the outer face of the arm transition region and a second tangent parallel to said first tangent, said first tangent extends at an angle of 45 degrees relative to the axis of the respective arm and said second tangent, when viewed from the center, is positioned behind the first tangent and is positioned on the outer face of the base member at a point which is located on a line of symmetry of the cross member, said line of symmetry extends at an angle of 45 degrees relative to the axis of the respective arm, said distance (X) corresponds to $\frac{1}{10}$ of the smallest radius of the respective arm, and said arms are induction-hardened such that the hardness run-out occurs in the region of the shoulder of the base member which is subjected to low stresses when the cross member is in operation.

2. A cross member according to claim 1, wherein the arms transition regions each end in the respective shoulder of the base member and form an annular indentation.

3. A cross member device according to claim 1, wherein a reduction in diameter occurs in the region adjoining the running face of the respective arm between the running face and the transition region.

4. A cross member according to claim 1, wherein the cross member is produced from a quenched and tempered chromium nickel steel.

* * * * *